Patented June 5, 1934

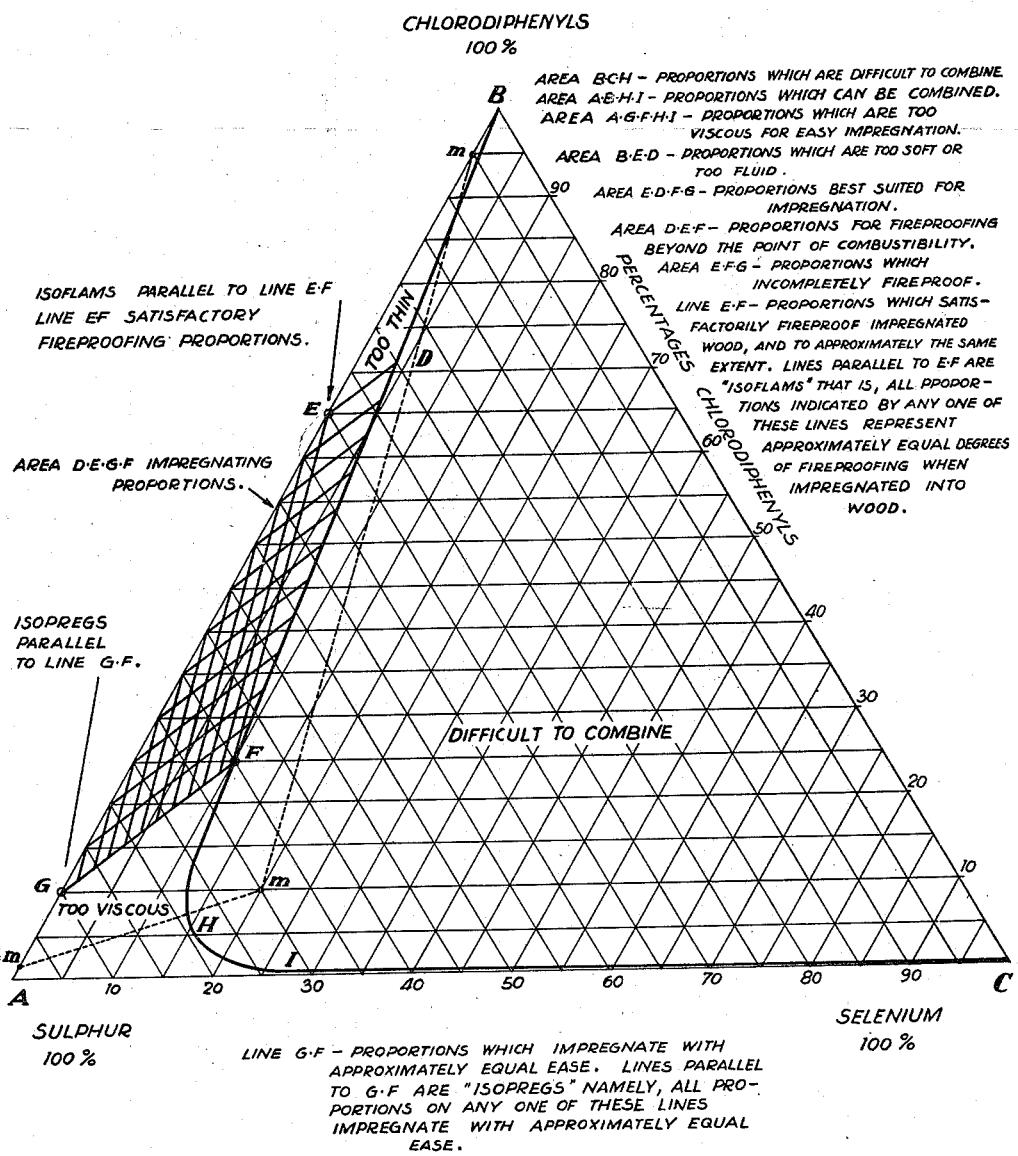

1,962,005

UNITED STATES PATENT OFFICE 1,962,005

COMPOSITION OF MATTER

Marc Darrin, Pittsburgh, Pa., assignor to F. N. Burt Company, Limited, Toronto, Ontario, Canada, a corporation of Ontario, Canada Application November 18, 1930, Serial No. 496,549

28 Claims. (Cl. 134—78.6)

This invention relates to a composition of matter.

It is an object of this invention to provide a composition which will be hard, durable, impervious, permanent and fireproof.

It is a further object to provide a material which may be given a wide variety of pleasing effects but which will be relatively inexpensive, both in its raw materials and labor.

It is a further object to provide a material which may be rendered plastic by heat but which on cooling will solidify into a hard, permanent, impervious mass.

In my copending application Serial #417,827, filed December 31, 1929, it is disclosed that the diphenyls and certain compounds and mixtures of them form a group of useful substances, the physical characteristics of which can be changed within limits by changes in the constituents.

It is particularly brought out that the chlorodiphenyls are remarkably resistant chemically and non-inflammable and are excellent solvents and blenders, and moreover, are excellent introfiers for the introduction of impregnants into porous materials. In that application it is also brought out that desirable compounds can also be made by mixing with the introfier sulphur, resins, oils, fats, greases, waxes, tars, pitches, asphalts, gilsonite, creosote and related products, and that these compounds in general will take coloring matters and dyes.

Desirable and related compositions can also be formed when other introfiers are employed in substitution for chlorodiphenyl.

These compositions, however, are not all fireproof. Fireproof compounds can be made with some introfiers, as for example, the highly chlorinated chlorodiphenyls but this requires a large quantity of the introfier which is relatively expensive.

In accordance with this invention it has been found that a very desirable compound can be formed by the addition of selenium to any of the above products so that fireproofing may be obtained with a smaller proportion of halogenated material than where it is attempted to secure the same degree of fireproofing without the selenium,—for example a compound containing 40 parts of polychlorinated diphenyls, 100 parts of sulphur and 15 parts of selenium has approximately as good a fireproofing effect, and it is much harder and of a higher melting point, than if 100 parts of sulphur be used with 200 parts of polychlorinated diphenyls without selenium.

The new compound may be used for a variety of purposes. It is particularly useful in impregnating porous materials such as wood, paper, cloth, asbestos, stone, concrete, ceremics, electrical conduits, insulated wire and other similar materials, and the new compound is particularly desirable for these uses because it is retained within the porous material better than where a compound without selenium is employed.

In general my new compound may be formed with any of the materials referred to, that is sulphur, resins, oils, fats, greases, waxes, tars, pitches, asphalts, gilsonite, creosote and related products together with an introfier and selenium, but some different results are obtained specifically in different cases, for example, chlorodiphenyls and sulphur are miscible in all proportions, and such melted mixtures will dissolve selenium and retain it in combination when cold. Where these three types of materials, therefore, are used in a compound, the resultant product retains all three in combination, and when such a product is used as an impregnating bath, this three-component solution enters into the pores of the material impregnated. This compound is not only fireproof in itself but it also reduces the flammability of the material into which it is introduced.

The accompanying drawing shows a diagram giving approximately the most suitable proportions in which chlorodiphenyls and selenium may be employed for fireproof purposes. This diagram is of the trilinear variety in which the lower left, the upper and the lower right hand corners respectively represent products which are 100% sulphur, 100% chlorodiphenyls and 100% selenium respectively and divergence from either corner toward the opposite side represents a product which contains lesser percentages of the substance represented by that corner, the remainder being composed of the other ingredients. In the diagram each line represents 5%. The legends upon the drawing explain the meaning of the various areas defined.

From the diagram it will be seen that the proportions of chlorodiphenyl and selenium may be varied within wide limits, but for any given degree of non-flammability the proportions of chlorodiphenyls and selenium are interdependent upon each other. In general the higher the quantity of selenium, the harder and stiffer the material and the more difficult it is to use while the large proportions of chlorodiphenyl produce a more fluid material. The area on the diagram which is indicated by the line m—m—m represents substantially the limits of practical impregnating compounds.

In general in the application of this process of impregnation with a bath containing sulphur, a halogenated diphenyl and selenium we take, by way of example,—65 parts of sulphur, 10 parts of selenium and 25 parts polychlorinated diphenyls. The sulphur bath may be heated until liquid, thereupon the selenium is stirred while continuing to heat the mass until a homogeneous liquid combination takes place, which usually will require only a few minutes. The mass during this solution thickens considerably and increases in viscosity depending upon the amount of selenium added. The polychlorinated diphenyls are then stirred into the solution.

The resulting mass comprises the impregnating composition. It may be cooled and broken up and thereafter transferred to the impregnating vats to be there remelted or it may be run directly into the impregnating bath while still in a molten state.

The composition to be impregnated may be dipped directly into the bath or for certain purposes special preliminary treatment may be employed, such as pre-drying or subjection to a vacuum or in some cases it may be desirable to employ an appreciable pressure upon the bath itself to assist in causing penetration by the bath.

The proportions suggested are illustrative only. A considerable range of many of these ingredients may be employed but these quantities are interdependent and reach their limits in the mutual solubility limitations. For example, selenium will generally not exceed 20% and this quantity seems to be dependent upon the presence of a high percentage of sulphur, for example, the best results with a composition containing 65% of sulphur are given by an impregnating bath of the composition described but if the proportion of chlorodiphenyl be increased say to 55%, good results may be obtained with a composition containing 3% of selenium and 55% chlorodiphenyl. A greater quantity of selenium may be introduced into such a compound up to, for example, 12 to 20% but the former compound with the smaller proportion of selenium is non-flammable and there is little if any gain in using a greater quantity of selenium in view of the cost of the material.

When, however, it is desired to employ asphalt or other bituminous compounds as a base material for impregnation, it will be found that the selenium is not readily soluble in the asphalt. In such case, therefore, it is desirable to add powdered selenium to the melted asphalt or to the melted mixture of sulphur and halogenated diphenyl. The selenium is held in suspension in the impregnating bath and on that account as the impregnating bath enters the material to be impregnated, the selenium is retained within the superficial pores of the material so that actual surface fireproofing is obtained out of proportion to the amount of selenium added.

Having described my invention, what I claim as new and desire to secure by Letters Patent, is:—

1. A composition of matter comprising a porous matrix impregnated with a mixture containing sulphur and selenium in proportions materially to retard combustion.

2. A composition of matter comprising a porous matrix impregnated with sulphur, selenium and a polyhalogenated introfier.

3. A composition of matter comprising a porous matrix impregnated with sulphur, selenium and a polychlorinated introfier in proportions to render the product non-flammable.

4. A composition of matter comprising a porous matrix impregnated with sulphur, selenium and a polychlorinated diphenyl.

5. A composition of matter comprising a porous matrix impregnated with sulphur, selenium and a polychlorinated diphenyl in proportions to render the product non-flammable.

6. A composition of matter comprising a cellulose matrix impregnated with a mixture containing sulphur and selenium in proportions materially to retard combustion.

7. A composition of matter comprising a cellulose matrix impregnated with sulphur, selenium and a polyhalogenated introfier.

8. A composition of matter comprising a cellulose matrix impregnated with sulphur, selenium and a polychlorinated introfier in proportions to render the product non-flammable.

9. A composition of matter comprising a cellulose matrix impregnated with sulphur, selenium and a polychlorinated diphenyl.

10. A composition of matter comprising a cellulose matrix impregnated with sulphur, selenium and a polychlorinated diphenyl in proportions to render the product non-flammable.

11. A composition of matter comprising a porous matrix having its pores substantially filled with a mixture containing sulphur and selenium in proportions materially to retard combustion.

12. A composition of matter comprising a porous matrix having its pores filled with sulphur, selenium and a polychlorinated introfier.

13. A composition of matter comprising a porous matrix having some of its pores filled with sulphur, selenium and a polychlorinated introfier in proportions to render the product non-flammable.

14. A composition of matter comprising a porous matrix having its pores filled with sulphur, selenium and a polychlorinated diphenyl.

15. A composition of matter comprising a porous matrix having its pores filled with sulphur, selenium and a polychlorinated diphenyl in proportions to render the product non-flammable.

16. A composition of matter comprising a cellulose matrix having its pores substantially filled with a mixture containing sulphur and selenium in proportions materially to retard combustion.

17. A composition of matter comprising a cellulose matrix having its pores filled with sulphur, selenium and a polyhalogenated introfier.

18. A composition of matter comprising a cellulose matrix having some of its pores filled with sulphur, selenium and a polychlorinated introfier in proportions to render the product non-flammable.

19. A composition of matter comprising a cellulose matrix having its pores filled with sulphur, selenium and a polychlorinated diphenyl.

20. A composition of matter comprising a cellulose matrix having its pores filled with sulphur, selenium and a polychlorinated diphenyl in proportions to render the product non-flammable.

21. An impregnating bath including sulphur and a polyhalogenated introfier and selenium, the latter two being in such proportions as to render the product substantially non-flammable.

22. The process of rendering an article non-flammable which comprises impregnating it with a bath containing selenium and a polychlorinated hydrocarbon.

23. The process of rendering an article non-flammable which comprises impregnating it with a bath containing sulphur and selenium, and a polychlorinated introfier.

24. The process of rendering an article non-flammable which comprises impregnating it with a bath containing sulphur and selenium and a polychlorinated diphenyl.

25. An impregnating bath containing substantially 65 parts of sulphur, 10 parts of selenium and 25 parts of polychlorinated diphenyls.

26. The process of hardening an impregnating bath containing chlorodiphenyls and sulphur which comprises adding selenium to the bath.

27. A non-flammable coating composition containing sulphur and selenium in proportions materially to retard combustion.

28. The process of rendering sulphur non-flammable which comprises incorporating selenium with the sulphur in proportions materially to retard combustion.

MARC DARRIN.